United States Patent [19]
Ono

[11] Patent Number: 5,398,548
[45] Date of Patent: Mar. 21, 1995

[54] KARMAN VORTEX FLOW METER

[75] Inventor: Mitsuhiro Ono, Himeji, Japan

[73] Assignee: Mitsubishi Denki Kabushiki Kaisha, Tokyo, Japan

[21] Appl. No.: 178,901

[22] Filed: Jan. 7, 1994

[30] Foreign Application Priority Data

Feb. 22, 1993 [JP] Japan .................. 5-031532

[51] Int. Cl.⁶ .............................................. G01F 1/32
[52] U.S. Cl. ...................... 73/202; 73/861.22
[58] Field of Search .............. 73/118.2, 202, 861.22, 73/861.23

[56] References Cited

U.S. PATENT DOCUMENTS

| | | | |
|---|---|---|---|
| 3,374,673 | 3/1968 | Trageser | 73/202 |
| 4,392,385 | 7/1983 | Okuda et al. | 73/861.23 |
| 4,982,602 | 1/1991 | Stiefel et al. | 73/118.2 |
| 5,052,229 | 10/1991 | Tanimura et al. | 73/861.22 |

FOREIGN PATENT DOCUMENTS

| | | | |
|---|---|---|---|
| 0158945 | 2/1983 | Germany | 73/861.23 |
| 0051311 | 4/1980 | Japan | 73/861.22 |
| 53422 | 10/1980 | Japan . | |
| 2129142 | 5/1984 | United Kingdom | 73/861.22 |

*Primary Examiner*—Herbert Goldstein
*Attorney, Agent, or Firm*—Sughrue, Mion, Zinn, Macpeak and Seas

[57] ABSTRACT

A Karman vortex flow meter in which a main passage 1 and a bypass passage 2 are adjacent to each other; a throttle portion 12 is formed at the inlet of the bypass passage to continuously reduce the cross-sectional surface area of the passage, and a flared portion 14 is formed in the bypass passage 2 so that the cross-sectional surface area of the passage is continuously enlarged from an intermediate portion of the passage to the outlet of it. Further, the inlets and the outlets of the main passage and the bypass passage are each arranged in single planes perpendicular to the flow direction of the fluid to be measured, and the boundary portions 16, 17 between the main passage and the bypass passage 2 are respectively formed to have a smallest thickness.

4 Claims, 5 Drawing Sheets

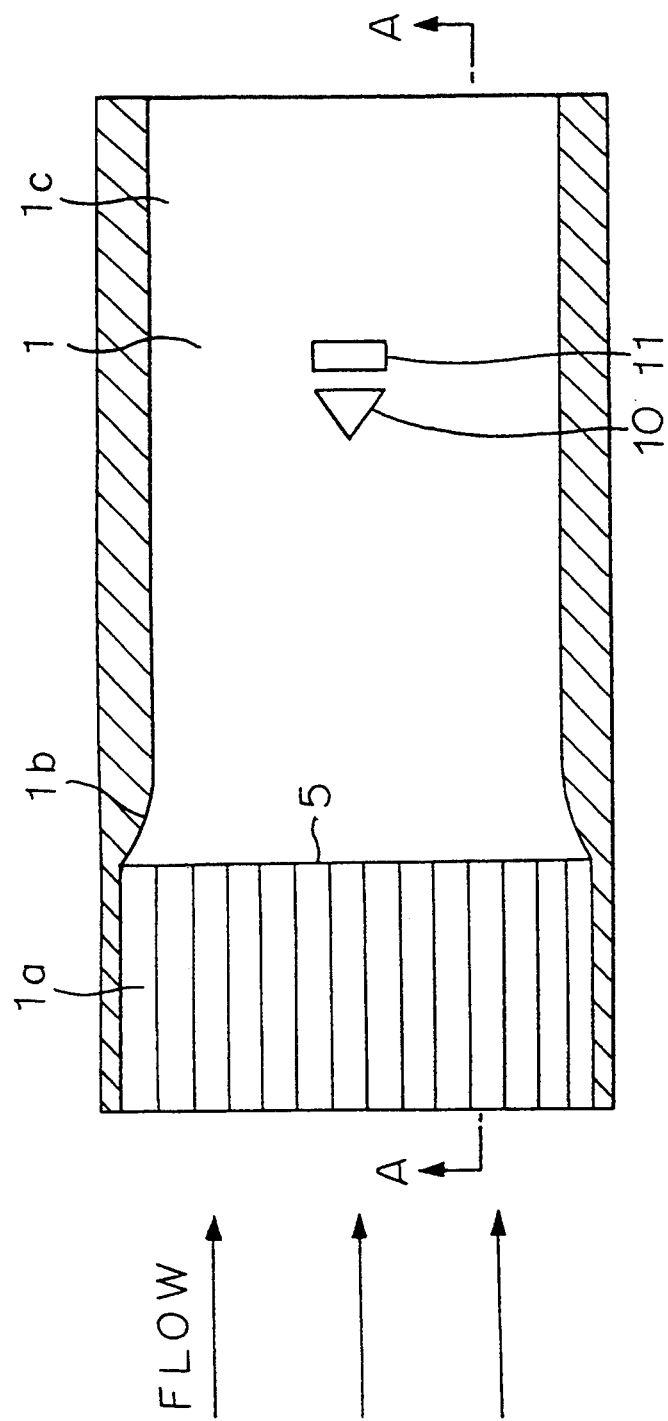

KARMAN VORTEX FLOW METER

BACKGROUND OF THE INVENTION

1. Field of the Invention

The present invention relates to a Karman vortex flow meter. Particularly, the present invention relates to a Karman vortex flow meter for reducing a pressure loss in fluid passing through it by improving the shape of its flow passage.

2. Discussion of Background

A Karman vortex flow meter is generally of such construction that a detection device for detecting a quantity of a vortex flow is disposed in a tubular main passage. In order to make the manufacturing of the Karman vortex flow meter having different cross-sectional surface areas easy, it has been proposed not to change the cross-sectional surface area of the main passage but to provide separately a bypass passage along the flowing direction of the main passage wherein the cross-sectional area of the bypass passage is changed.

A Karman vortex flow meter having such a bypass passage is disclosed in, for instance, Japanese Unexamined Utility Model Application No. 53422/1980.

The Karman vortex flow meter disclosed in the Publication is shown in FIGS. 1 through 3.

FIGS. 1 and 3 are respectively side views cross-sectioned and a front view of a first embodiment of the Karman vortex flow meter wherein a main passage 1 and bypass passages 2 are provided. The main passage 1 is of a tubular form in which an inlet portion 1a is enlarged; the cross-sectional surface area of the flow passage of the main passage 1 is reduced at a throttle portion 1b, and a reduced cross-sectional surface area portion is extended to an outlet portion 1c. In the outlet portion 1c, a vortex flow generating means 3 and a vortex flow detecting means 4, which constitute a vortex flow detecting device, are provided. The vortex flow detecting means 4 is constituted by an ultrasonic wave transmitter 4a and an ultrasonic wave receiver 4b.

A rectifier 5 is disposed at the enlarged portion, i.e., the inlet portion 1a. An ultrasonic wave absorbing material 6 made of, for instance, non-woven cloth or the like is disposed in the entire region or a necessary portion along the tubular inner wall of the main passage 1 so that the function of the vortex flow detecting means 4 can be improved. The ultrasonic wave transmitter 4a and the ultrasonic wave receiver 4b are respectively covered with net-like bodies 7. The bypass passages 2 are so arranged as to surround the main passage 1 along the flow direction of fluid. The cross-sectional surface area of each of the bypass passages 2 is reduced at an inlet portion 2a and the cross-sectional surface area is enlarged at the portion corresponding to the throttle portion 1b of the main passage 1, the enlarged portion being extended to an outlet portion 2b. Supporting pieces 8 are provided in the bypass passages 2 in order to reinforce the main passage 1 and the bypass passages 2.

FIG. 2 shows a second embodiment of the Karman vortex flow meter disclosed in the above-mentioned Publication. In this embodiment, the bypass passages 2 do not surround the main passage 1 but they are formed separately from the main passage 1 so that the main passage 1 and the bypass passages 2 are joined in the radial direction. The bypass passages 2 have respectively an enlarged inlet portion 2a in the same manner as the enlarged inlet portion 1a of the main passage 1, and they are joined at the inlet portions 1a and 2a. Numerals 9 designate flanges for connecting another passage, and numerals 21 designate rod-like bodies which may have different cross-sectional surface areas so that the flow rate of fluid flowing in the bypass passages can be controlled. The other structural elements are the same as those in the first embodiment.

In either case, the cross-sectional surface area of the main passage 1 is enlarged at the inlet portion 1a and a rectifier 5 is disposed in the enlarged portion so that the detection of a vortex flow can be effectively conducted, and the outlet portion 1c of the main passage 1 in which the flow rate detecting device is disposed has a reduced cross-sectional surface area.

In operation of the conventional vortex flow meters, fluid such as air flowing through a suction pipe (not shown) is introduced through the inlet portions 1a, 2a of the main passage 1 and the bypass passages 2 of the Karman vortex flow meter. The fluid in the main passage 1 is rectified by the rectifier 5, and then, the fluid impinges the vortex generating means 3 in the outlet portion 1c to generate a vortex. The flow rate of the fluid is measured by detecting a quantity of the vortex flow by means of the vortex flow detecting means 4.

The conventional Karman vortex flow meter had the problems described blow.

In the Karman vortex flow meter shown in FIGS. 1 and 3, since a portion extended to the outlet portion 2b from the inlet portion 2a in the bypass passages was abruptly enlarged, there was a large possibility of causing separation and disturbance in the fluid due to a vortex flow at the abruptly enlarged portion. The separation and the disturbance of the fluid resulted in that the kinetic energy of the fluid was transformed into a heat energy, whereby the reduction of the kinetic energy caused an increased pressure loss. When the pressure loss increased, the density of the fluid is decreased. When such a Karman vortex flow meter is disposed in an engine system, the reduction of engine power is invited.

In the Karman vortex flow meter shown in FIG. 2, since the bypass passages 2 were enlarged at each of the inlet portions 2a, the disturbance of the fluid could be minimized at a portion extended to the outlet portions 2b from the inlet portions 2a. However, the conventional flow meter had such a construction that the main passage 1 was formed separately from the bypass passages 2 and then, they were joined later. Accordingly, the wall thickness at a joining portion was fairly thick, so that there was a resistance to the fluid entering into the Karman vortex flow meter, with the result that the disturbance of the fluid was large, and there was an increased pressure loss in the same manner as the flow meter as shown in FIG. 1 and 3.

Further, in the flow meter shown in FIG. 2, since the flow passage of the bypass passages 2 was abruptly enlarged at the outlet portions, the pressure loss was further increased.

SUMMARY OF THE INVENTION

It is an object of the present invention to provide a Karman vortex flow meter of a type having a bypass passage which bypasses a part of fluid from a main passage in which a vortex flow detecting means is provided wherein a pressure loss due to disturbance of the fluid can be reduced by minimizing the disturbance of the fluid in the bypass passage or minimizing the disturbance of the fluid at an inlet and outlet portions of the main passage.

In accordance with the first invention, there is provided a Karman vortex flow meter which comprises a main passage through which fluid to be measured is passed, a bypass passage disposed in parallel to the main passage to pass a part of the fluid therethrough, and a vortex flow detecting means provided in the main passage. The bypass passage comprises a throttle portion for reducing continuously the cross-sectional surface area of the bypass passage from an inlet portion, and a flared portion for enlarging continuously the cross-sectional surface area of the bypass passage from an intermediate portion of the bypass passage to an outlet portion of the same.

In accordance with the second invention, there is provided a Karman vortex flow meter which comprises a main passage through which fluid to be measured is passed, a bypass passage disposed in parallel to the main passage to pass a part of the fluid therethrough, and a vortex flow detecting means provided in the main passage. An inlet of the main passage and an inlet of the bypass passage are arranged in a single plane which is substantially perpendicular to the flowing direction of the fluid to be measured; the main passage and the bypass passage are adjacent to each other, and the boundary portion between the main passage and the bypass passage at their inlets has the smallest thickness necessary for separating the main passage from the bypass passage.

In accordance with the third invention, there is provided a Karman vortex flow meter which comprises a main passage through which fluid to be measured is passed, a bypass passage disposed in parallel to the main passage to pass a part of the fluid therethrough, and a vortex flow detecting means provided in the main passage. An outlet of the main passage and an outlet of the bypass passage are arranged in a single plane which is substantially perpendicular to the flow direction of the fluid to be measured; the main passage and the bypass passage are adjacent to each other, and the boundary portion between the main passage and the bypass passage at their outlets has the smallest thickness necessary for separating the main passage from the bypass passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a cross-sectional view viewed from the top of a Karman vortex flow meter according to a first embodiment of the present invention;

DETAILED DESCRIPTION OF THE PREFERRED EMBODIMENTS

Figure 1:
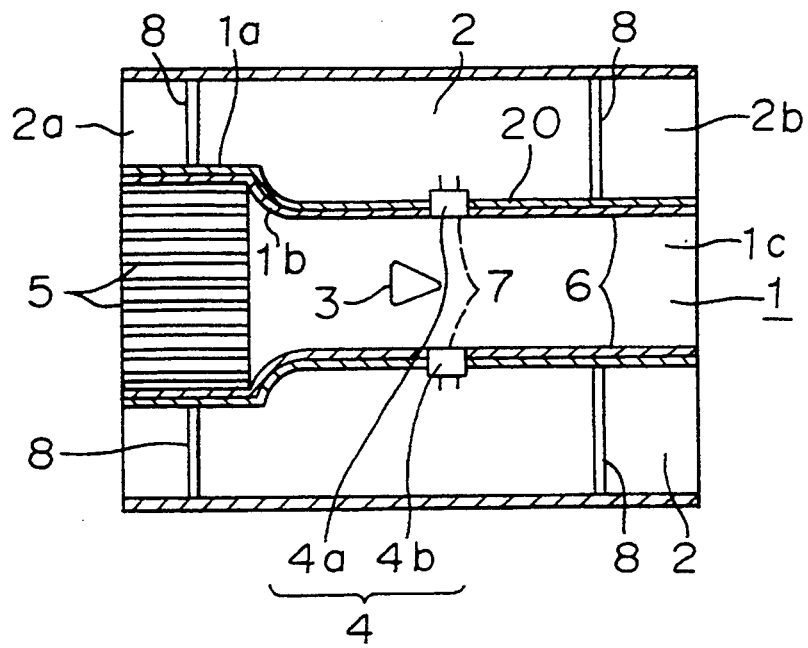
FIG. 1 is a cross-sectional view viewed from the top of a conventional Karman vortex flow meter.
Figure 2:
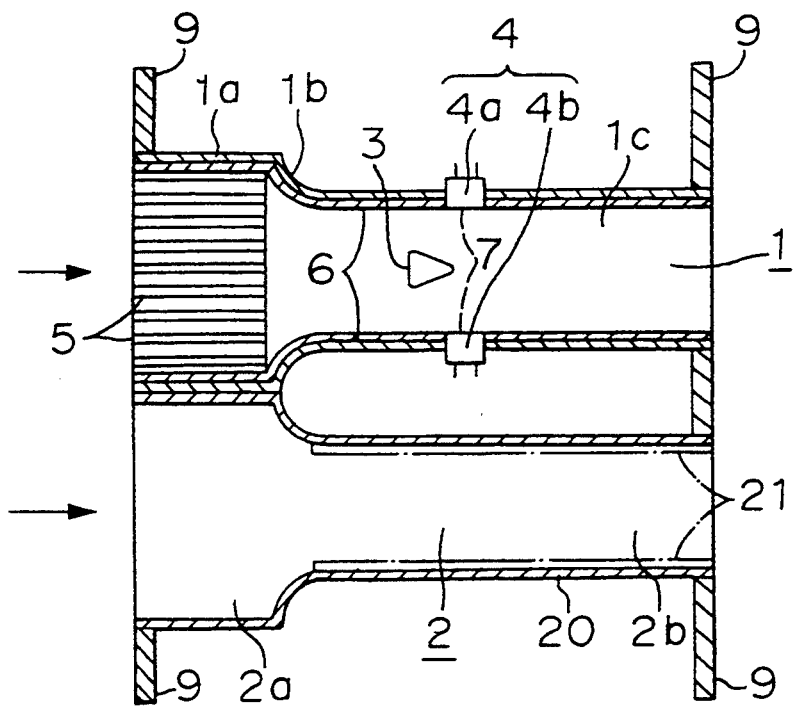
FIG. 2 is a cross-sectional view viewed from the top of another conventional Karman vortex flow meter.
Figure 3:
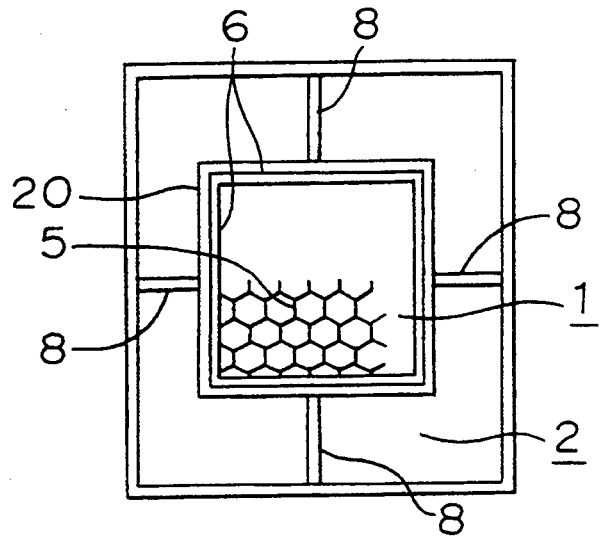
FIG. 3 is a front view of the flow meter shown in FIG. 1.
Figure 5:
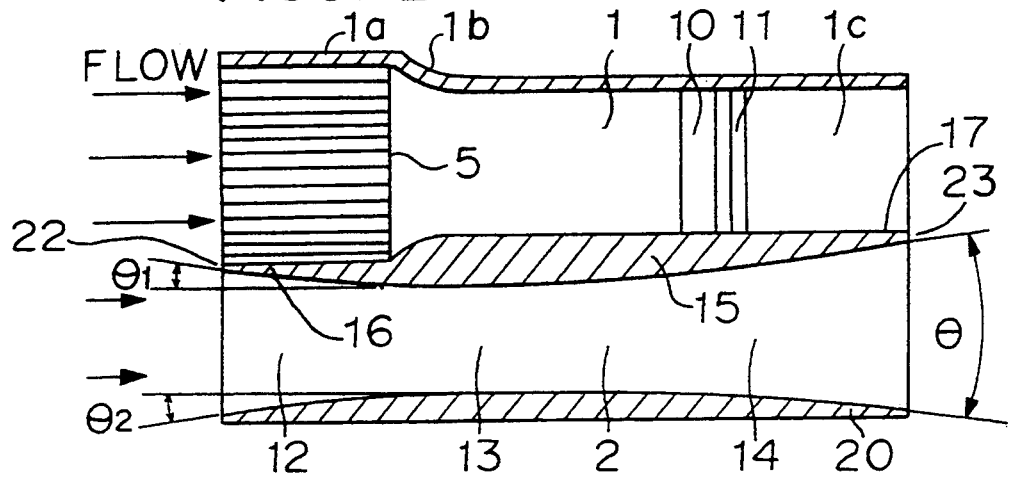
FIG. 5 is a cross-sectional view taken along a line A—A in FIG. 4.
Figure 6:
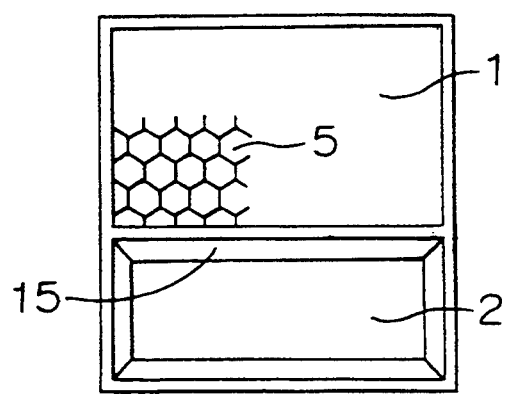
FIG. 6 is a front view of the Karman vortex flow meter according to the first embodiment of the present invention.

Referring to the drawings wherein the same reference numerals designate the same or corresponding parts, FIGS. 4 through 6 designate the first embodiment of the present invention.

A Karman vortex flow meter comprises a main passage 1 and a bypass passage 2. The main passage 1 has an inlet portion 1a, a throttle portion 1b and an outlet portion 1c in the same manner as the conventional flow meter. The fluid flow area of the inlet portion 1a is enlarged in comparison with that of the outlet portion 1c, and a rectifier 5 is disposed in the inlet portion 1a. A vortex generating pillar 10 and vortex detecting pillar 11 are provided in an intermediate portion of the main passage 1.

The operation of the detection of a flow rate of fluid passing through the main passage 1 is the same as that described with respect to the conventional technique, and accordingly, description is omitted.

The bypass passage 2 is formed of a tubular body 20 as shown in FIG. 5 wherein the cross-sectional surface area of the flow passage is continuously or gently reduced from the inlet portion, and the portion where the cross-sectional surface area of the bypass passage 2 is continuously or gradually reduced constitutes a throttle portion 12.

A reduced portion 13 where the cross-sectional surface area of the flow passage is minimum, is formed around the middle portion of the flow passage of the bypass passage 2. A flared portion 14 is formed from the reduced portion 13 to the outlet of the bypass passage 2 so that the cross-sectional surface area of the flared portion is continuously or gently increased. The throttle portion 12, the reduced portion 13 and the flared portion 14 are formed by thickening or thinning the inner wall thickness of the tubular body which constitutes the bypass passage 2.

An angle formed between the throttle portion 12 or the flared portion 14 and the flow passage or the flow direction of fluid (i.e. $\theta_1 + \theta_2$ or $\theta$ in FIG. 5) is about 6°.

The edge of the inlet portion of the main passage 1 and the edge of the inlet portion of the bypass passage 2 are arranged in a single and same plane which is substantially perpendicular to the flowing direction of the fluid to be measured. Further, as shown in FIG. 5, the main passage 1 and the bypass passage 2 are adjacent to each other in the direction traversing their flow passages by interposing a partition wall 15 which constitutes a part of tubular bodies. Further, a boundary portion 16 (a part of the partition wall 15) between the main passage 1 and the bypass passage 2 at the inlet portion of the Karman vortex flow meter has the smallest thickness necessary for separating the main passage 1 from the bypass passage 2. The thickness of the boundary portion 16 can be to the extent that it is difficult to cause disturbance of the fluid even when the fluid introduced into the vortex flow meter impinges the boundary portion 16.

The edges of the outlet portions of the main passage 1 and the bypass passage 2 are arranged in a single and the same plane in the same manner as the edges of the inlet portions of the main passage 1 and the bypass passage 2, and the thickness of a boundary portion 17 can be the smallest thickness in the same manner as described with respect to the boundary portion 16.

In the Karman vortex flow meter according to the first embodiment of the present invention, the behavior of the fluid passing through the bypass passage 2 is as follows. In FIG. 5, the fluid is introduced from the direction of the flow arrows. Then, at the upstream side 22 of the partition wall, a part of the fluid impinges on the boundary portion 16. However, since the boundary portion 16 is formed to have the smallest thickness, the fluid does scarcely impinge on the boundary portion 16, and accordingly, it flows into the Karman vortex flow meter without causing disturbance.

Then, the fluid flows into the throttle portion 12 having a continuously reduced flow passage in the bypass passage 2. The fluid, then, flows through the flared portion 14 having a continuously enlarged flow passage. Thus, the fluid dose not flow through portions where the cross-sectional surface area of the flow passage is abruptly changed. Accordingly, there is no possibility of separation and disturbance of the fluid in the bypass passage 2, and the fluid flows smoothly.

Further, since the thickness of the boundary portion 17 at the outlet of the bypass passage 2 is also formed to have the smallest thickness necessary for separating the main passage from the bypass passage, disturbance of the fluid in a portion where streams of the fluid are joined at the downstream end 23 of the partition wall 15 which separates the main passage 1 from the the bypass passage 2 can be minimized. Further, since the angle formed between the flared portion 14 and the direction of the flow passage is about 6°, a pressure loss which is caused when the fluid flows out the bypass passage 2 can be reduced.

Figure 7:
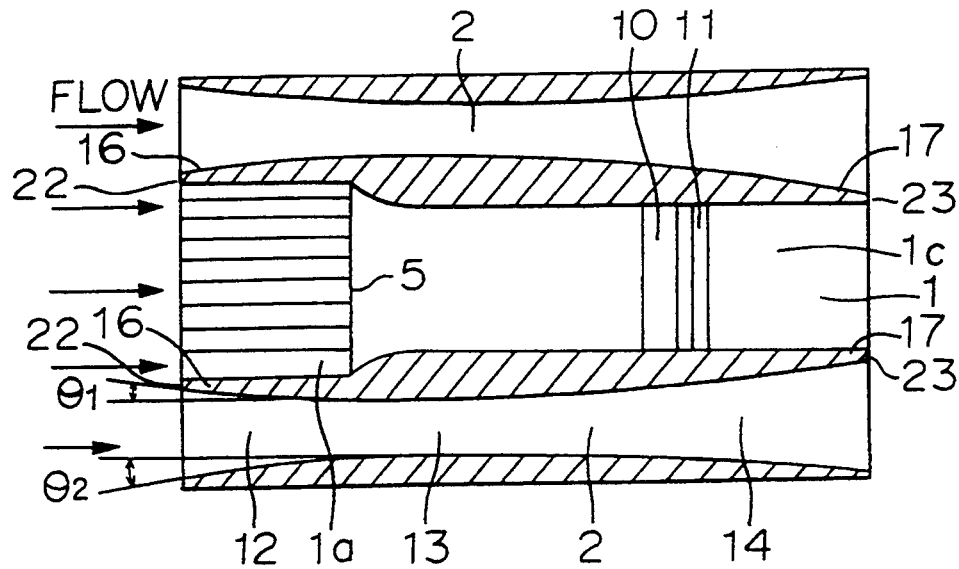
FIG. 7 is a cross-sectional view viewed from a side of a Karman vortex flow meter according to a second embodiment of the present invention.
Figure 8:
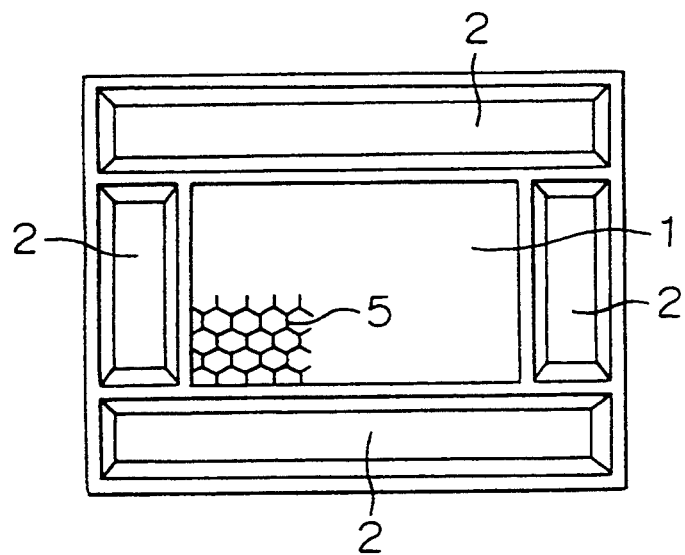
FIG. 8 is a front view of the flow meter according to the second embodiment of the present invention.

FIGS. 7 and 8 show the second embodiment of the present invention wherein FIG. 7 is a cross-sectional side view from a side of the vortex flow meter and FIG. 8 is a front view of it.

In the second embodiment, four bypass passages 2 are provided so as to surround four sides of the main passage 1. The inlet portion 1a of the main passage 1 is enlarged and the outlet portion 1c is throttled so that the cross-sectional surface area of the main passage is reduced in comparison with that of the inlet portion 1a.

The construction of each of the bypass passages 2 is the same as that of the first embodiment. Namely, the bypass passage 2 has a throttle portion 12 where the cross-sectional surface area of the flow passage is continuously reduced from the inlet portion to the downstream side of it, and a flared portion 14 having a continuously enlarged portion which is formed from an intermediate portion of the flow passage to the outlet portion. Further, boundary portions 16, 17 which separate the main passage 1 from the bypass passages 2 at the inlet and outlet portions are so formed as to have the smallest thickness. Further, an angle formed between the slant surface of the throttle portion 12 or the flared portion 14 and the flow direction of the fluid ($\theta_1 + \theta_2$) is about 6°.

The operation of the second embodiment is the same as that of the first embodiment, and accordingly description is omitted.

Figure 9:
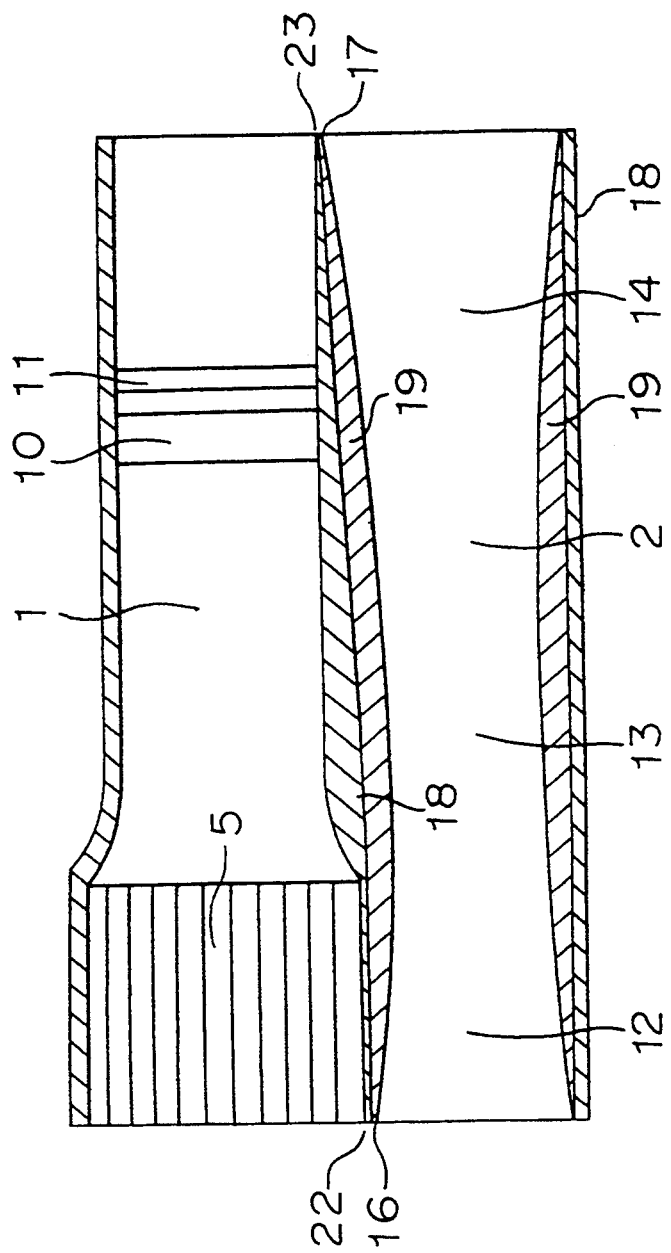
FIG. 9 is a cross-sectional view viewed from a side of a Karman vortex flow meter according to a third embodiment of the present invention.

FIG. 9 shows a third embodiment of the present invention.

The construction of the Karman vortex flow meter of the third embodiment is substantially the same as that of the first embodiment except that the bypass passage is constituted by an outer shell portion 18 and a passage main body 19 wherein the passage main body 19 is detachably fitted to the inner wall of the outer shell portion 18. The third embodiment allows to easily form bypass passages having different cross-sectional surface areas.

In accordance with the first embodiment of the present invention, the bypass passage has no portion where the cross-sectional surface area of the flow passage is abruptly changed, whereby fluid can be smoothly passed without causing separation and disturbance. Further, a pressure loss of the fluid in the flow passage can be prevented, and the reduction of the kinetic energy of the fluid is avoidable.

In accordance with the second embodiment of the present invention, there is no risk that the fluid introduced into the bypass passage impinges on the boundary portion thereby resulting disturbance flow, and a pressure loss of the fluid can be prevented.

In accordance with the third embodiment of the present invention, there is no risk that two streams of fluid flowing in the main passage and the bypass passage impinge on each other at a junction to thereby cause a disturbance flow, and a pressure loss of the fluid can be prevented.

Further, in accordance with the above-mentioned embodiments, the cross-sectional surface area of the bypass passage can be easily changed.

Obviously, numerous modifications and variations of the present invention are possible in light of the above teachings. It is therefore to be understood that within the scope of the appended claims, the invention may be practiced otherwise than as specifically described herein.

What is claimed is:

1. A Karman vortex flow meter, comprising: a main passage through which a fluid to be measured is passed, at least one bypass passage disposed closely adjacent and parallel to the main passage to pass a part of the fluid therethrough, and vortex flow detecting means disposed in the main passage, wherein the bypass passage comprises a throttle portion for reducing gradually and continuously the cross-sectional area of the bypass passage from an inlet thereof, and a flared portion for enlarging gradually and continuously the cross-sectional area of the bypass passage from an intermediate portion thereof to an outlet thereof, and wherein an angle of convergence at the throttle portion and an angle of divergence at the flared portion, relative to an axis of the bypass passage, is about 3°.

2. A Karman vortex flow meter according to claim 1, wherein the bypass passage comprises an outer shell portion and an inner flow passage body detachably inserted in the outer shell portion.

3. A Karman vortex flow meter according to claim 1, wherein an inlet of the main passage and the inlet of the bypass passage are arranged in a single plane substantially perpendicular to the flow direction of the fluid, and a boundary wall between the main passage and the bypass passage has a small, knife edge-like thickness at the inlets thereto.

4. A Karman vortex flow meter according to claim 1, wherein an outlet of the main passage and the outlet of the bypass passage are arranged in a single plane substantially perpendicular to the flow direction of the fluid, and a boundary wall between the main passage and the bypass passage has a small, knife edge-like thickness at the outlets thereof.

* * * * *